Dec. 24, 1968  G. FALBEL  3,418,478
HORIZON SENSOR USING TWO STATIONARY FIELDS OF VIEW SEPARATED
BY A FIXED ELEVATION ANGLE WHICH ARE ALTERNATELY SAMPLED
Filed Aug. 29, 1966  2 Sheets-Sheet 1

INVENTOR
GERALD FALBEL
BY Joseph Levinson
ATTORNEY

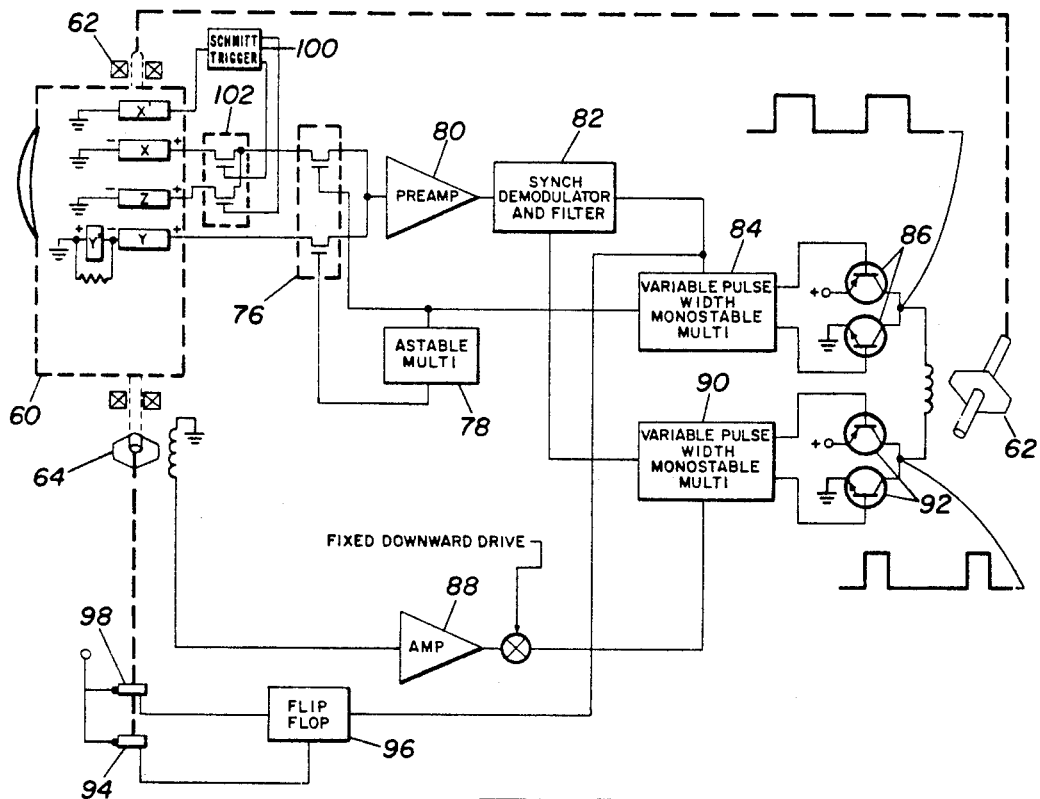
Fig_3
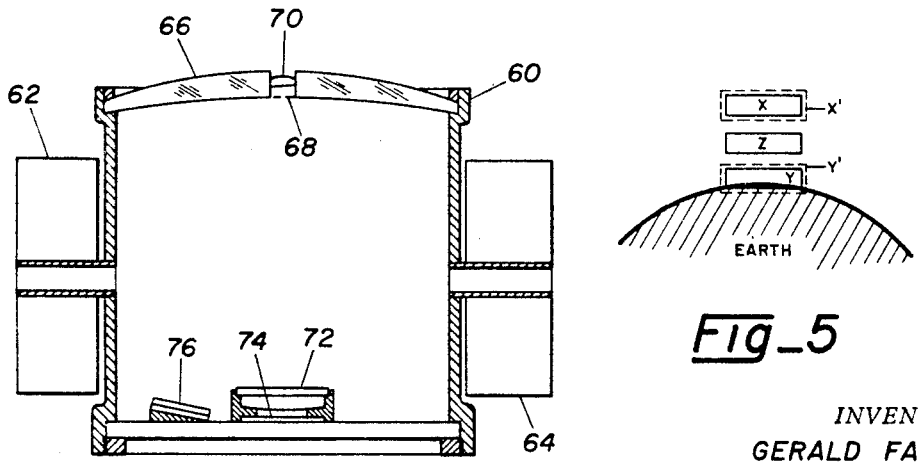
Fig_4
Fig_5
INVENTOR.
GERALD FALBEL

United States Patent Office 3,418,478
Patented Dec. 24, 1968

3,418,478
HORIZON SENSOR USING TWO STATIONARY FIELDS OF VIEW SEPARATED BY A FIXED ELEVATION ANGLE WHICH ARE ALTERNATELY SAMPLED
Gerald Falbel, Stamford, Conn., assignor to Barnes Engineering Company, Stamford, Conn., a corporation of Delaware
Continuation-in-part of application Ser. No. 390,334, Aug. 18, 1964. This application Aug. 29, 1966, Ser. No. 582,784
7 Claims. (Cl. 250—202)

ABSTRACT OF THE DISCLOSURE

A horizon sensor is provided which includes infrared detector means having two separate stationary fields of view separated by a fixed angle in elevation with the upper field positioned on outer space and the lower field riding on the horizon. The fields of view are alternately sampled optically or electronically by the detector means to generate correction signals for maintaining the desired positioning.

---

Figure 1:
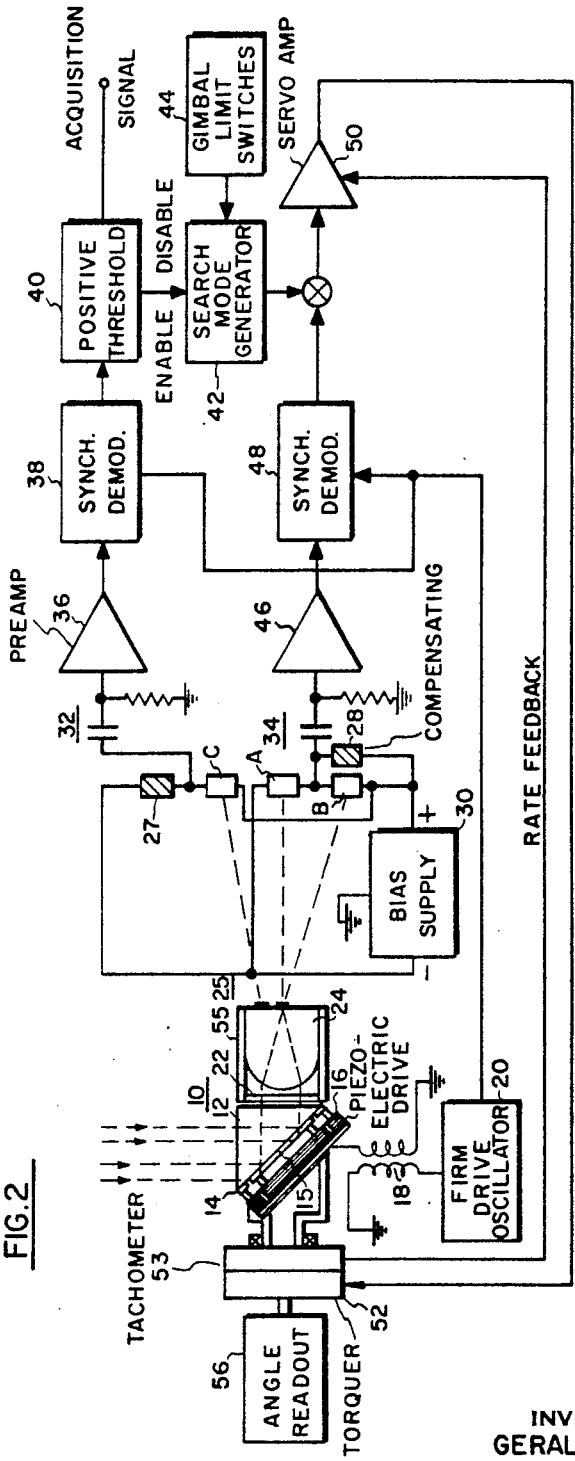

This invention relates to horizon sensors, and more particularly to edge tracking type horizon sensors. This application is a continuation-in-part of application Ser. No. 390,334, now abandoned, entitled, Horizon Sensor, filed Aug. 18, 1964.

A planet horizon such as the earth's provides a thermal gradient between the planet and outer space. This discontinuity or thermal gradient is quite pronounced, especially from high altitudes, and is characterized by a large difference in infrared radiation between the planet and outer space. Horizon sensors utilize this large difference in infrared radiation for determining the orientation and altitude of high-flying aircraft, missiles, satellites, and the like with respect to the planet whose thermal gradient is being utilized. Typical horizon sensors, such as that shown and described in Patent No. 3,020,407, continuously scan the horizon and outer space, applying the optical radiation received therefrom to a radiation detector whose electrical output is utilized for generating signals which may be used to correct and/or determine the position of the sensor with respect to the horizon of the planet being scanned. Although highly successful, the scanning type sensors are characterized by high-speed moving parts, which somewhat limit sensor operational life, due to mechanical wearout or fatigue. Accuracy may also be degraded by continuous scanning over large angles, as well as angular lag in the presence of high vehicular angular acceleration. The present invention is directed to an improved sensor which eliminates the necessity of a continuously rotating or oscillating optical head for scanning across the horizon.

It is an object of this invention to provide an improved horizon sensor having a wide tilt-and-altitude range without degraded accuracy.

A further object of this invention is to provide an improved horizon sensor with no high-speed moving parts and no inherent limitations on sensor operational life due to mechanical wearout or fatigue.

Another object of this invention is to provide an improve horizon sensor system having mechanical simplicity, ruggedness, and low electronic parts count, and yet achieves high operational reliability and accuracy.

In carrying out this invention, a horizon sensor is provided having infrared detector means which are provided with two separate stationary fields of view separated by a fixed angle in the elevation plane of each tracking head. The separation between the stationary upper field of view and the stationary lower field of view is relatively wide. Means are provided for alternately measuring radiation applied to the infrared detector means from the stationary upper and lower fields of view. The two fields of view are servo positioned within the scan plane so as to measure the declination angle to the horizon relative to the vehicle in which the sensor is positioned. Tracking is accomplished by providing means whereby the stationary lower field of view rides on the horizon being tracked, while the upper field of view is continually directed toward space at a fixed angle from the lower field. In one illustrative embodiment of the invention, switching is accomplished optically by applying radiation from one stationary field of view and then the other to the infrared detector means. In another illustrative embodiment, switching is accomplished electronically by sequentially sampling the infrared detector means which views the upper field of view and then the infrared detector means which views the lower field of view.

Figure 2:
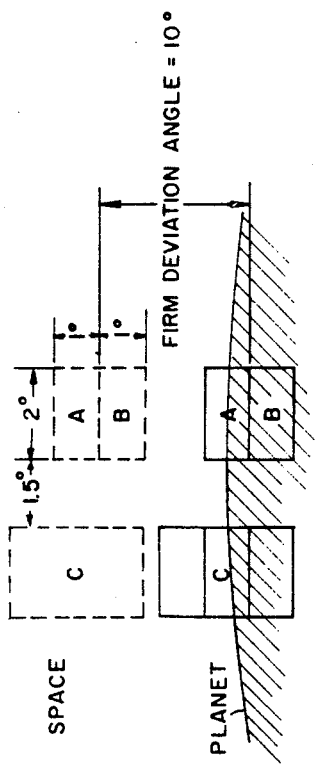

The invention, together with further objects and advantages thereof, may best be understood by reference to the following description taken in connection with the accompanying drawings, in which:

FIG. 1 is a block schematic diagram of an illustrative embodiment of a horizon sensor in accordance with this invention, FIG. 2 illustrates the fields of view of infrared detector means of FIG. 1, FIG. 3 is a black schematic diagram of another illustrative embodiment of the horizon sensor of this invention, FIG. 4 shows a pivoted optical configuration which may be employed in the horizon sensor of FIG. 3, and FIG. 5 illustrates the fields of view of the detectors of FIG. 3.

In the horizon sensor system of this invention, the vertical attitude relative to the local vertical about two axes is defined by either three or four optical heads, whose scan planes are situated 90° apart in azimuth on the vehicle. Vertical tilt relative to the local vertical is obtained by measuring the difference between horizon declination angles obtained from each optical head. The exact nature of this tilt readout depends upon the orientation of the sensor scan planes relative to the vehicle axes. The horizon tracking signal is obtained by comparing the infrared radiance seen in two fields of view separated by a fixed angle in the elevation plane of each tracking head. These two stationary fields of view are servo positioned within a scan plane, so as to measure the declination angle to the horizon relative to the vehicle. In the special case of an earth synchronous orbit, it is possible to utilize only two sensor heads.

In the present invention, two stationary fields of view separated by a relatively large angle are continuously alternately sampled for tracking the horizon. As has been pointed out, this sampling may be done optically or electronically. One means of optically sampling is shown in an application Ser. No. 345,000 entitled, "Small Angle Field of View Deflector," now abandoned, which discloses an optical device for moving a radiation detector's field of view between two different positions in space separated by a small angle utilizing the principles of frustrated internal reflection. The optical device is a frustrated internal reflection modulator hereinafter referred to as FIRM, which produces optical modulation of incoming infrared energy by varying the spacing between two optical prisms, preferably by piezoelectric devices. Very briefly, the FIRM unit includes a first prism which is provided with a surface making an angle greater than critical with the incident radiation applied thereto. A second prism is provided having a surface parallel to the aforesaid surface of the first prism, and electrical transducer means, preferably a piezoelectric device, for controlling the separation or the interface between the parallel surfaces of the first and second prisms in response to electrical signals. If the surfaces at the interface between the two prisms are sufficiently separated, infrared radiation entering the first prism will be totally internally reflected in the first prism. However, if the second prism is moved very close to the first prism, closing the interface therebetween, on the order of less than 0.1 wavelength of the infrared energy applied thereto, the infrared energy penetrates the interface, and total internal reflection is frustrated. The amount of this frustration is a function of the spacing between the two optical prisms. If the interface is completely closed, no reflection takes place from the interface, but reflection may take place from another surface of the second prism.

Referring now to FIG. 1, there is shown a block diagram of one of the heads of the horizon sensor. The sensor includes a FIRM unit 10 having prisms 12 and 14 with an interface 15 therebetween, which prisms are driven by a piezoelectric drive 16. The piezoelectric drive 16 is equivalent to almost a pure capacitance which requires insignificant power, and therefore the piezoelectric drive 16 is driven by a simple sinusoidal oscillator 20 whose voltage is stepped up by a transformer 18 and applied to the piezoelectric drive 16. Radiation from the field of view is applied from the FIRM unit 10 through an interference filter 22, which is preferably in the 14-16 micron range, to a germanium immersed thermistor detector 25 which includes an immersion lens 24 and thermistor flakes A, B, C, along with a compensating flake 28 for flake B and a compensating flake 27 for flake C. The mounting of the three active thermistor flakes A, B and C on the immersion lens 24 eliminates the requirement of multiple optics, as the immersion lens 24 is used as the objective lens for the detectors. The fields of view defined by thermistor flakes A, B and C are 1° in elevation by 2° in azimuth, arranged in the pattern shown in FIG. 2. Thermistor flake C and compensating flake 27 are connected in a bridge and fed from a bias supply 30, and their output is taken from their junction and applied to an acquisition channel 32. The thermistor flakes A and B are connected in a bridge, with thermistor flake B being shunted by compensating flake 28, and are fed from the bias supply 30, with their output being taken from the junction of thermistor flakes A and B and applied to a tracking channel 34.

The acquisition channel 32 includes a preamplifier 36, a synchronous demodulator 38, a positive threshold circuit 40, a search mode generator 42, and gimbal limit switches 44. The synchronous demodulator 38 has applied thereto the sinusoidal output from the FIRM drive oscillator 20 so that demodulation takes place in synchronism with the FIRM drive. The track channel 34 includes a preamplifier 46, a synchronous demodulator 48, and a servo amplifier 50. The servo amplifier drives a brushless, D.C. torquer 52 which in turn drives a servo shaft 55 which includes the FIRM unit as well as the detector 25. The servo shaft 55 may also include the preamplifiers 36 and 46, if so desired. The angle of the servo shaft 55 may be read out by an angle readout 56 in the form of a digital encoder. Servo stability is provided by providing rate feedback between the servo amplifier 50 and a D.C. brushless tachometer 53. The rate feedback provided by the companion D.C. brushless tachometer 53 insures rapid servo response and the required stability to produce a high degree of accuracy and resolution.

In operation the FIRM unit 10 moves the fields of view of the thermistor detector array of thermistors A, B and C between two elevation angles in space. When the prisms 14 and 12 are separated, thus the interface 15 being open, the three fields of view defined by the thermistor flakes A, B and C are situated above the horizon. When the prisms 12 and 14 are abutting, in other words the interface 15 being closed, the fields of view of the thermistor detectors straddle the horizon as shown in FIG. 2. The FIRM deviation angle is determined by the small angles prism 14 which can readily be made any value, but in the illustrated example a 10° angle has been chosen. The interface 15 is opened and closed by the piezoelectric drive 16. The voltage for the piezoelectric drive 16 is provided by the FIRM drive oscillator 20, whose output is also applied to synchronous demodulators 38 and 48 so that detection takes place in synchronism with the FIRM unit 10. From FIG. 2 it will be seen that half of the field of view of thermistor flake A is situated below the horizon while the field of view of thermistor flake B is completely below the horizon. Assuming that the thermistor flakes A and B have an equal responsivity factor ($\alpha$) and that a 50% null point is chosen, then an equation for the system at null is as follows:

$$N_\lambda \Omega \alpha \frac{R_B}{2} = N \frac{\Omega}{2} \alpha R_A \qquad (1)$$

where $N_\lambda$=the earth radiance
$\Omega$=field of view solid angle
$R$=nominal resistance of the thermistor flakes. (It is assumed that the resistance of the compensator flake equals $R_B$.)

Accordingly, it will be apparent from the above equation that the thermistor flake A-B bridge output in zero with respect to any A.C. component when the horizon splits the field of view of thermistor detector A as shown in FIG. 2. It is possible to shift the null point so that it may occur for any percentage of earth radiance on the fields of view of thermistor flakes A and B by changing the value of resistance for the compensating flake 28. It should also be noted with respect to Equation 1 that since $N_\lambda$ is situated on both sides of Equation 1, the null point is independent of horizon radiance. However, a responsivity match between the thermistor flakes A and B is required if the null point is not to shift. If the horizon position deviates to provide an A.C. output from the A-B bridge, this signal is fed to preamplifier 46 and synchronously demodulated in the synchronous demodulator 48 and applied to the servo amplifier 50, which in turn drives the brushless D.C. torquer 52, driving the servo shaft 55 which positions the optical assembly until the null point is again achieved. Synchronous demodulation preserves the phase reversal, which allows a relatively wide acquisition range which, in the present case, was chosen to be 10°.

The aforesaid description relates to the operation of the system in its tracking mode. However, if no signal is received by the detector 25, which means that the horizon does not appear in the field of view of the detector, the search mode generator 42 of the acquisition channel 32 is enabled, and its output applied to the servo amplifier 50 and in turn to the torquer 52, driving the sensor head to a maximum elevation angle and then slewing it downward at a search rate set by the search mode generator. The limits of the search mode generator are set by the gimbal limit switches 44. When the horizon is intersected, as acquisition signal is applied from the bridge consisting of thermister flake C and compensating flake 27 to the asquisition channel 32 which signal is amplified in preamplifier 36 and demodulated by the synchronous demodulator 38 and applied to the positive threshhold circuit 40. If the acquisition signal exceeds the positive threshold of the positive threshold circuit 40, the search mode generator is disabled thereby and the system switched to the track mode described above. When the system is operating in the tracking mode, it will be apparent that a signal will always be obtained from the thermistor flake C. This signal will be proportional to the amount of the field of view of thermistor flake C which extends below the horizon. Horizon acquisition will be determined by the level set in the positive threshold circuit 40, which, when exceeded, disables the search mode generator 42 and transfers the system to the track mode. Synchronous demodulation is provided in the acquisition channel 32 to prevent the system from providing an acquisition signal when it is upside down and also to minimize any disturbance produced by the sun or moon in the acquisition field.

From FIG. 2 is will be seen that the field of view of thermistor flake C extends to a higher elevation angle than that of detectors A or B, which eliminates the possibility of the system falsely locking on a cloud edge. The threshold level of the positive threshold 40 may be set higher, which would enable the search mode generator 42 if the thermistor flakes A, B were drawn below the true horizon by high altitude clouds. Although it has not been discussed in great detail, it was pointed out previously that a filter 22 was provided to make the system sensitive only to radiation in the 14–16 micron band, which being the case, the appearance of clouds would not affect the operation of the system. However, the larger detector flake C is a further guarantee of freedom from the cloud lock-on problem.

For the system to operate properly, it is essential that some means be provided for the elimination of the possibility of the sensor locking onto the sun or the moon during any part of its scan. This is achieved in the present system by providing a 1.5° azimuth separation between the tracking detector flakes A and B and the acquisition detector flake C. This separation is illustrated in FIG. 2. Since the sun or the moon can never be larger than 1° for reasonably close earth orbits, a sun or moon signal can only occur on the tracking detector flakes A and B or on the acquisition detector flake C at any given time. Therefore, if the sun or moon provides a tracking signal from the thermistor flake A–B bridge, the thermistor flake C will provide no signal and the system will not revert to the tracking mode and will be swept through the sun or moon by the torquer 52 until the true horizon is intersected. Conversely, if the sun or moon occurs on detector flake C, the detector A–B bridge sees only space, and a tracking signal will not be generated, so that the system will continue to search for the horizon. Accordingly, object discrimination is provided by the spacing of the detector array.

The aforesaid embodiment of this invention is related to the optical field switching aspects of this invention, whereas the illustrative embodiment shown in FIGS. 3, 4 and 5 illustrate one approach for field switching electronically. An illustrative optical system for this embodiment is shown in FIG. 4 which is mounted in a pivoted assembly 60. The optical system includes lens 66 which applies incoming radiation through a filter 72 onto two or more thermopile detectors 74. Since the system is preferably operated the 14–16 micron carbon dioxide band, or in the 14–35 micron water vapor band, the filter 72 is designed to pass the band in which the sensor operates, for example for the 14–35$\mu$ band filter 72 may consist of an optical crorecting element on which a 14$\mu$ cut-on interference coating is applied. The thermopile detectors 72 are solid-backed bismuth-tellurium junctions having a rectangular configuration illustrated in FIG. 3 as thermopiles X, X', Y, Y', and Z. Other types of thermocouples, such as bismuth-antimony, may be utilized. Thermocouple detectors are preferred in the electronic switching embodiment because of their particular suitability for application in electronic switching, and their ease of fabrication, in which all the thermopile detectors may be vacuum deposited on a single substrate. A pinhole aperture 68 which holds a glass wedge 70 is situated in the center of the lens 66. As will be pointed out in more detail hereinafter, this combination serves to direct the irradiance of the sun in the visible region to silicon photodetectors 76 located beside the thermopile detectors 74. The silicon photodetectors 76 are masked so that they view the same fields as do two of the thermopile detectors 74. This arrangement prevents the sensor from locking onto the sun when it is situated in the scan plane above the horizon.

Horizon edge tracking is accomplished in the embodiment of FIG. 3 by applying a fixed downward drive to the servo pivoted assembly 60 so that the lower field of view of thermopile Y is driven into the horizon by an amount sufficient to generate a buckout signal equivalent to this fixed downward drive. Accordingly, during tracking the lower field of view Y rides on the horizon as is indicated in FIG. 5.

The electronic processing circuit diagram illustrating the invention in its electronic switching mode, for one sensor head, is shown in FIG. 3. The thermopiles X, Y, Z and silicon photodetectors X' and Y' are mounted in the servo pivoted assembly 60. In normal operation the D.C. microvolt level output of thermopiles X and Y produced by the received horizon irradiance is sampled by an MOS field effect transistor low-level switch 76. The MOS field effect low-level switch is driven by an astable multivibrator 78. The sampled thermopile signal is amplified in a preamplifier 80 and applied to a synchronous demodulator and filter 82. The astable multivibrator 78 is also connected to the sync demodulator and filter 82, which demodulates the applied signal in accordance with the switching rate of the astable multivibrator 78. The ±D.C. filtered output of the synchronous demodulator 82, which provides a pulse width control, is applied to a variable pulse width monostable multivibrator 84 and through a power transistor switch 86 to a brushless D.C. torquer 62 which drives the pivoted assembly 60. The output of the transistor switch 86 is a variable upward pulse drive from horizon toward space. A constant downward drive from space toward the horizon to the pivoted assembly 60, mixed with the amplified (88) output of a brushless D.C. tachometer 64, is used for rate stabilization of the servo. This downward drive and rate stabilization signal is applied to another variable pulse-width monostable multivibrator 90. It will be noted that the astable multivibrator 78 is also connected to the variable pulse-width monostable multivibrator 84 and 90, so that the phase of the drive signals is controlled by the electronic switching rate of the astable multivibrator 78. The output of multivibrator 90 is applied to power transistor switch 92 to provide a constant downward drive from space toward horizon pulsed output which is applied to the torquer 62. It should be noted that the upward and downward drive signals are both applied in the pulse mode, so that at tracking equilibrium, when the field of view of thermopile Y rides the horizon, the two opposite motor drive pulses will be in phase, and essentially zero current will flow through the motor drive coil.

Separate search and track modes are not required for this sensor, since the downward drive applied to the torquer 62 provides a search function, and tracking is automatically achieved when the lower field of view of thermopile Y intersects the horizon. In the event that the horizon is not acquired on the first downward pass after the sensor is turned on, the downward drive moves the pivoted member to a bottom limit stop, at which point a magnetically actuated read switch 94 is engaged. This sets a flipflop 96 whose output is connected to the multivibrator 84 which produces an upward bias signal which drives the servo to its top limit switch 98. This in turn resets the flipflop 96 so that the downward drive horizon-search action begins again until a horizon is acquired.

It will be seen on FIGS. 3 and 5 that the silicon photodetectors X' and Y' have fields of view X' and Y' which are superimposed over the main thermopile fields X and Y, respectively. The arrangement shown prevents the sensor from locking onto the sun instead of the horizon. The detector X' has its output connected to a Schmitt trigger 100 which in turn controls a MOS–FET switch 102. The switch 102 connects either thermopile X or Z to the switch 76. If the sun enters fields X and X', its presence is sensed by the silicon photodetector X', and thermopile Z is automatically switched by the switch 102 and substituted for the field X. Thermopile Z and its associated field of view continue in use until the sun leaves the fields of X and X'. The geometry of fields X and Z are such that the sun cannot enter both fields simultaneously. The silicon photodetector Y' is connected in series and in opposition to thermopile Y. If the sun enters fields Y and Y', a signal is generated by the silicon detector Y' which serves to counteract the sun's infrared signal which is also applied to Y, therefore producing a voltage tending to drive the servo assembly toward the horizon It is not essential to provide a close responsivity match between the silicon and thermopile detectors. The silicon detectors X' and Y' act only when the sun is within the thermopile's field of view, and the signals produced by the silicon detectors serve only to either perform a switching operation or to drive the sun out of the thermopile's field of view.

One of the problems which may be encountered when the thermopile views outer space is that an offset voltage will be generated which is a function of the difference in ambient temperature of the sensor and the temperature of cold space. A negative D.C. term is therefore added to the thermopile outputs and the effect on sensor errors of any detector responsivity mismatch is greatly accentuated. An offset radiation source (not shown) may be utilized to radiantly heat up the thermopile junctions so that all of the thermopiles produce essentially zero microvolts output when they view cold space. The offset radiation source is shown and described in an application Ser. No. 406,097 filed Oct. 23, 1964, now Patent No. 3,348,048.

The horizon sensor of this invention can operate successfully in either the 14–35 micron atmospheric absorption region or in the more narrow carbon dioxide region centered at about 15 microns. Although cold cloud edges can be seen in the 14–35 micron region, the present sensor cannot erroneously lock on a cold cloud edge. This cloud lock-on elimination is uniquely obtained with the present field switching concept used in the sensor of this invention due to the wide angular separation of the field of view of the thermopile detectors. By wide angular separation is meant 1° or more in elevational separation of the fields, and preferably more on the order of separation of 10°. The particular angular separation which is chosen will depend on the mission to be accomplished and the environmental factors in such use. By having one field of view continually looks at space, a reference of 0° K. is produced which is lower than the coldest clouds' radiance. Accordingly, cloud edges will cause insignificant errors in the sensor of this invention, and no false cloud edge lock-on will result. Due to the absolute space reference, the present tracker has no spectral band-width limitation for earth application. Furthermore, the edge tracking sensor of this invention can operate successfully on such planets as the Moon, Mars, Venus, Jupiter, etc. where cloud and crater edges cannot be eliminated by spectral means.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. An edge tracking horizon sensor for providing high accuracy edge tracking of the horizon utilizing the thermal gradient between the horizon and space, comprising
   (a) infrared detector means,
   (b) means for providing a stationary upper field of view and a stationary lower field of view, separated by a relatively wide angle in the vertical direction, for said infrared detector means,
   (c) switching means for alternately sampling radiation applied to said infrared detector means which generates signals in response to radiation received from said stationary upper field of view and said stationary lower field of view, and
   (d) means utilizing said signals for riding said stationary lower field of view on the horizon which is to be tracked while said stationary upper field of view is continually directed toward space.

2. The edge tracking horizon sensor set forth in claim 1 wherein said switching means comprises optical means for applying radiation alternately from said stationary upper and lower fields of view to said infrared detector means.

3. The edge tracking horizon sensor set forth in claim 2 wherein said optical means is comprised of a frustrated internal reflection modulator.

4. The edge tracking horizon sensor set forth in claim 1 wherein separate infrared detector means are provided for receiving radiation from said stationary upper and lower fields of view, and said switching means alternately samples the outputs of said infrared detection means.

5. The edge tracking horizon sensor set forth in claim 4 wherein said infrared detector means are thermopiles.

6. The edge tracking horizon sensor set forth in claim 5 wherein said switching means are comprised of a field effects transistor switch.

7. The edge tracking horizon sensor set forth in claim 5 in which said thermopiles are mounted in a pivoted assembly, means driving said pivoted assembly for riding said lower stationary field of view on the horizon in response to signals from said thermopiles.

References Cited

UNITED STATES PATENTS

| | | | |
|---|---|---|---|
| 2,949,536 | 4/1960 | Langton | 250—203 X |
| 2,999,161 | 9/1961 | Lovoff | 250—83.3 |
| 3,112,399 | 11/1963 | Chew | 250—203 X |
| 3,304,425 | 2/1967 | Astheimer | 250—83.3 |

RALPH G. NILSON, *Primary Examiner.*

T. N. GRIGSBY, *Assistant Examiner.*

U.S. Cl. X.R.

250—201, 203, 83.3